United States Patent Office 2,802,550
Patented Aug. 13, 1957

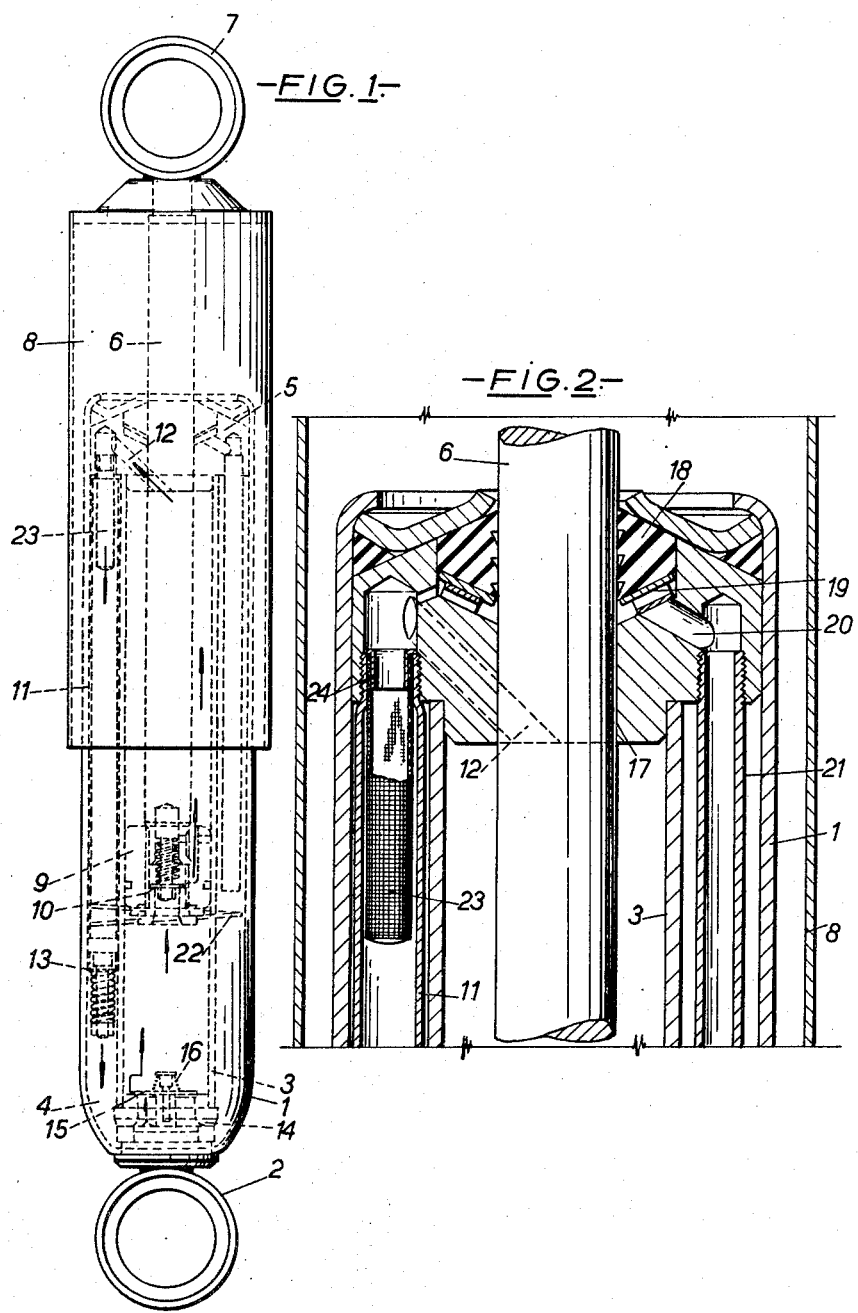

2,802,550
SHOCK ABSORBER WITH FILTER

Harry Donald Chambers, Acomb, York, England, assignor to Armstrong Patents Co. Limited, Beverly, England, a British company Application May 26, 1955, Serial No. 511,306

Claims priority, application Great Britain June 3, 1954

6 Claims. (Cl. 188—88)

The present invention relates to telescopic hydraulic shock absorbers. This invention relates more particularly to the improved type of absorber wherein the hydraulic fluid flow is unidirectional as described in Patent Number 2,672,952 issued on March 23, 1954 and having a common assignee with the instant application.

In spite of every precaution it has been found that in every telescopic hydraulic shock absorber there exists some foreign matter, e. g., metal particles. This foreign matter is very likely to score or jam the moving component parts of the absorber and coupled with the fine clearances of all the component parts, which are essential to the satisfactory operation of the absorber, makes it a practical necessity to collect and separate from the circulating hydraulic fluid such foreign matter as is contained therein and which may be formed during operation of the absorber by the friction between the metallic parts or such as may be caused by imperfections during machining of the parts or which may even have been inadvertently incorporated during assembly of the absorber.

It is an object of the present invention to provide in a telescopic hydraulic shock absorber means for collecting foreign matter either formed or deposited in the absorber during manufacture assembly or operation of the component parts of the absorber whereby continued efficient operation of the absorber is maintained during the life thereof.

It is another object of the present invention to provide in a telescopic hydraulic shock absorber wherein the hydraulic fluid flow is unidirectional; filter means for separating out from the hydraulic fluid impurities or foreign matter which would otherwise interfere with the efficient operation of the component parts of the absorber and substantially without impairing the efficiency of the absorber or the circulation of the hydraulic fluid.

The telescopic hydraulic shock absorber constructed according to the present invention comprises in combination, a pressure cylinder, a piston axially displaceable within said pressure cylinder, a hydraulic fluid reservoir disposed around said pressure cylinder and communicating with the bottom of the latter, at least a pair of similarly directed one-way valves, one of which is disposed in said piston to control hydraulic fluid flow between opposite sides thereof and the other of which is disposed in the communication between the hydraulic fluid reservoir and the pressure cylinder to control flow therebetween, a hydraulic fluid discharge pipe leading from the upper end of the pressure cylinder and extending into said hydraulic fluid reservoir below the level of the fluid therein and having a further one-way valve at the discharge thereof whereby hydraulic fluid from the pressure cylinder is dischargeable into the hydraulic fluid reservoir only so that the path of hydraulic fluid in the absorber can only be unidirectional. A filter means, or means for collecting or separating out foreign matter is provided preferably in the hydraulic fluid discharge pipe and adjacent the piston shaft portion of the piston or the pressure cylinder and upstream from the one-way valve in the hydraulic fluid discharge pipe so that foreign matter which would otherwise interfere with the operation of the component parts of the absorber is collected or filtered from the circulating hydraulic fluid during operation of the absorber so that wear and tear of the component parts is considerably reduced.

In a preferred form of the invention, the filter means or means for collecting or separating out foreign matter consists of a wire gauze sack, the open end of which is attached to the upper end of a discharge pipe and the closed end of which extends in the pipe in the direction of the one-way valve associated therewith. The sack may be substantially cylindrical or may also take the form of an elongated truncated cone.

The early introduction of the filter means or means for collecting or separating out foreign matter traps during the life of the absorber those pieces of metal which may be present in spite of every precaution within the body of the absorber and which would normally be circulated through to the one-way valves during normal operation. The troublesome metal particles are retained within the gauze sack and the shock absorber functions normally thereafter.

The invention will be further described with reference to one form of shock absorber embodying the present invention, taken by way of example and illustrated in the accompanying drawings.

In the drawings:

Figure 1 is an exterior view of the shock absorber in which certain interior detalis essential to the operation thereof are indicated by broken lines, and Figure 2 is an axial section of part of the shock absorber showing in greater detail the location of the filter means.

A tube 1 is provided with a ring forging 2 secured to a closed end thereof by welding or brazing and affording attachment to one part of a vehicle. The tube 1 contains a cylinder 3 of smaller diameter which is arranged co-axial with the tube 1 to define an annular hydraulic fluid reservoir 4 between the tube and the cylinder. The other end of the cylinder is closed by a cylinder head 5 through which passes a piston rod 6 having a ring forging 7 secured at the free end of the piston 6 by welding or brazing. A tubular casing 8 is spot welded on to periphery of ring forging 7 in order to protect the shock absorber against grit and small stones. A piston 9 slidable in the cylinder 3 is fixed to the piston rod 6 and contains a spring-loaded one-way disc valve 10 arranged to allow the passage of hydraulic fluid through the piston to the piston rod side thereof.

A further tube 11 of comparatively small cross-section is screwed into the head of the cylinder 3 eccentrically with respect to the axis of the cylinder and depends into the hydraulic fluid reservoir 4. The interior of this tube 11 is in communication with the cylinder through an obliquely drilled passage 12 in the cylinder head. A spring-loaded one-way disc valve 13 is arranged at the free end of the tube 11 to allow the expulsion of hydraulic fluid from the tube into the reservoir 4. The bottom of the cylinder 3 is closed by a valve body 14 which includes a spring steel disc 15 axially slidable on a rivet and loaded by a spring 16 to act in a well known manner as a one-way valve in conjunction with the valve body for affording admission of hydraulic fluid from the reservoir through the valve body into the cylinder.

The piston rod 6 is provided with a sliding fit in an axial bore 17 in the cylinder head (see particularly Figure 2) and, this bore thereby serves as a bearing so that the cylinder head defines a bearing bush for the piston rod. An appropriately shaped recess in the upper portion of the cylinder head accommodates a rubber gland 18 having a series of internal lips whose object it is to wipe off any liquid adhering to the piston rod. The gland 18 is subject to the pressure of a spring 19 which has an undulating shape in the circumferential surface thereon. An oblique bore 20 in the cylinder head serves to direct any hydraulic fluid wiped from the piston rod 6 by the gland 18 into a drain tube 21 screwed into the cylinder head 5 and depending into the reservoir 4. A baffle 22 is provided in the reservoir below but adjacent to the free end of the drain tube 21 with primary object of reducing surge and turbulence of hydraulic fluid rising and falling in the drain tube. The cylinder 3 is completely filled with an appropriate hydraulic fluid or liquid which also partially fills the reservoir 4. The ring forgings 2 and 7 are attached respectively to parts of a vehicle whose relative movement is to be cushioned. On a movement resulting on impact applied to the vehicle, the piston moves downwardly in the cylinder, the piston valve is unseated, and liquid is displaced through the piston to the piston rod side thereof. Due to the introduction of part of the piston rod 6 into the cylinder 3, there will be an excess of liquid which must be displaced through the oblique passage 12 into the depending tube 11. Such excess liquid unseats the one-way valve 13 and passes into the reservoir.

On a rebound movement, the movement of the piston is reversed causing the liquid to be drawn from the reservoir 4 through the valve body 14 into the lower part of the cylinder. This movement once again expels liquid from the upper part of the cylinder 3 through the depending tube 11 and associated one-way valve into the reservoir 4. It will therefore be appreciated that in operation circulation of the liquid by reciprocation of the piston will always be in the same direction, as indicated by the arrows in Figure 1. It is noted that the term "connecting means" hereinafter used in the claims is applied to refer to connecting passageway 12 between hydraulic fluid exhaust side of pressure cylinder 3 and conduit 11, passageway between free end of conduit 11 and reservoir 4, and passageway between reservoir 4 and hydraulic fluid inlet side of pressure cylinder 3, all said passageways defining a hydraulic fluid endless circulation path. The valve means 10, 13, 16, is provided in the connecting means along the endless circulation path. A filter means or means for collecting or separating out foreign matter and hereinafter in the specification designated as a filter is disposed in the endless path of circulation of the liquid between the piston and the one-way valve 13 which is associated with the tube 11.

The construction of the filter must take into account various factors highly peculiar to its service or use in a hydraulic shock absorber and as described infra. The practical size of aperture necessary to trap such foreign matter as would affect valve operation is of primary importance and must be determined in relation to fluid flow in order to avoid restricting same. It has been found that the aperture should have a maximum linear dimension of about 15 thousandths of an inch, preferably less, for instance in the range of 9 to 13 thousandths. In order to minimise any possibility of clogging of the filter a large filtering surface is desirable. Also a large through flow area is desirable in order to avoid, as far as possible, restriction of the liquid flow. Yet against these desiderata there must be weighed the conflicting requirement of compactness in keeping with the limited free space available for accommodation of the filter. A satisfactory compromise has been found by forming the filter as a sack. Furthermore, the filter must be capable of resisting without rupture or impairment the force of liquid passed through it. In a shock absorber having a piston diameter of ⅞ inch (this being quoted as indicative of the mass flow of liquid), it has been found that a plain weave at 60 meshes per inch of copper or bronze wire gage No. 35 or having a diameter of 0.0084 inch is a suitable material from which the filter sack may be formed. This wire diameter permits producing in such plain woven wire gauze apertures approximating to 9 thousandths of an inch square.

Another factor to be considered is where in the path of the hydraulic fluid the filter will be most effective so as to minimize the circulation of any foreign matter contained in the hydraulic fluid and reduce or possibly eliminate circulating any foreign matter through the component parts of the absorber. In this respect the unidirectional nature of the path of hydraulic fluid is of importance since the position of the filter must be determined according to where the courses of foreign matter are found and which moving parts must be protected against the deleterious action of such foreign matter as may be found in the absorber. Thus, it was found that the filter should be positioned as closely adjacent as possible to the wearing surfaces and in the portion of the path of the main stream of circulating hydraulic fluid close to where during operation of the absorber foreign matter would probably be formed and preferably upstream from any of the one-way valves in the path of said circulating stream of hydraulic fluid.

This position was determined to be in the hydraulic fluid discharge pipe 11 where the main stream of the hydraulic fluid circulates and which leads from the upper end of the pressure cylinder 3 and extends into the hydraulic fluid reservoir 4 upstream from one-way valve 13 and which is also closely adjacent the rubbing surfaces of the piston rod 6 and of bore 17. Hence, any foreign matter formed or found in the pressure cylinder 3 on the piston rod side of the piston would be carried by the main stream of circulating hydraulic fluid into the filter and advantage would be taken of the flow of hydraulic fluid through one-way valve 10 to prevent collection of foreign matter on top of the piston rod side of piston 9. The path of any foreign matter contained in the main stream of circulating hydraulic fluid from the pressure cylinder 3 and into the reservoir 4 does not extend through any of the one-way valves and the main stream of circulating hydraulic fluid is continuously cleansed of any foreign matter as same may be formed without impeding flow of the main stream since the filter is constructed while taking into account the considerations set forth supra.

As shown particularly in Figure 2, the filter is in the form of a sack 23 of plain woven smooth drawn metal wire, preferably non-ferrous, for instance of copper or bronze. This sack is formed of a tube of such gauze which is closed at one end, for instance by a blob of solder. The tube may be seamed, but, with certain types of gauze, it will prove quite satisfactory if merely wrapped. The sack is arranged in the end of the depending tube 11 which is screwed into the cylinder 5 to extend with its mouth opposite the direction of circulation of the liquid and the sack is fixed at the mouth of the tube 11 by eyelet or sleeve 24.

Having thus described an embodiment of the invention, it is understood that certain changes may be made in the invention and that these changes are defined in the spirit and scope of the appended claims.

What is claimed is:

1. In a telescopic hydraulic shock absorber having a pressure cylinder, a hydraulic fluid reservoir, and a piston reciprocable in said pressure cylinder; connecting means defining a hydraulic fluid endless circulation path between said hydraulic fluid reservoir and said pressure cylinder and through said piston, valve means provided in said connecting means for circulating hydraulic fluid unidirectionally along said path from said pressure cylinder through said piston and into said hydraulic reservoir thence back into said pressure cylinder when impact is applied upon said shock absorber, and filter means provided in said connecting means along the portion of said path which is upstream from said hydraulic reservoir for trapping foreign matter mixed with the hydraulic fluid whereby foreign matter is substantially prevented from circulating with the hydraulic fluid and through said valve means.

2. In a telescopic hydraulic shock absorber constructed according to claim 1, said filter means including an elongated sack closed at one end and the mouth portion of which is positioned facing in the direction of flow of the circulating hydraulic fluid.

3. In a telescopic hydraulic shock absorber constructed according to claim 2, said elongated sack consisting of an open mesh woven thin metal wire.

4. In a telescopic hydraulic shock absorber having a pressure cylinder, a hydraulic fluid reservoir, and a piston assembly reciprocable in said pressure cylinder; and dividing said pressure cylinder into hydraulic inlet and exhaust chambers; connecting means defining a hydraulic fluid endless circulation path between said hydraulic fluid reservoir and said pressure cylinder and through said piston, a hydraulic fluid discharge conduit provided in said connecting means and along a portion of said path leading from said hydraulic fluid exhaust chamber and adjacent the piston rod portion of said piston assembly, said conduit extending into said hydraulic fluid reservoir, valve means provided in said connecting means for circulating hydraulic fluid unidirectionally along said path from said hydraulic fluid inlet chamber to said hydraulic fluid exhaust chamber of said pressure cylinder through the piston portion of said piston assembly and through said conduit into said hydraulic fluid reservoir thence back into said hydraulic fluid inlet chamber of said pressure cylinder when impact is applied upon said shock absorber, and filter means provided in said connecting means along the portion of said path which is at the inlet portion of said conduit for trapping foreign matter mixed with the circulating hydraulic fluid, whereby foreign matter is substantially prevented from circulating with the hydraulic fluid and through said valve means.

5. In a telescopic hydraulic shock absorber constructed according to claim 4, said filter means including an elongated sack closed at one end and the mouth portion of which is positioned facing in the direction of flow of the circulating hydraulic fluid.

6. In a telescopic hydraulic shock absorber constructed according to claim 5, said elongated sack consisting of an open mesh woven thin metal wire.

References Cited in the file of this patent

UNITED STATES PATENTS

| | | |
|---|---|---|
| 1,828,383 | Anderson | Oct. 20, 1931 |
| 2,048,285 | Padgett | July 21, 1936 |
| 2,635,715 | Riedel et al. | Apr. 21, 1953 |

FOREIGN PATENTS

| | | |
|---|---|---|
| 148,413 | Australia | Sept. 29, 1952 |